US012699068B2

(12) United States Patent
Kauffmann et al.

(10) Patent No.: US 12,699,068 B2
(45) Date of Patent: Aug. 4, 2026

(54) ELECTROCHEMICAL SENSOR SYSTEM AND METHOD

(71) Applicant: Purdue Research Foundation, West Lafayette, IN (US)

(72) Inventors: Philip James Kauffmann, West Lafayette, IN (US); Jeffery Edward Dick, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 169 days.

(21) Appl. No.: 18/607,045

(22) Filed: Mar. 15, 2024

(65) Prior Publication Data

US 2024/0310323 A1    Sep. 19, 2024

Related U.S. Application Data

(60) Provisional application No. 63/452,465, filed on Mar. 16, 2023.

(51) Int. Cl.
*G01N 27/416*        (2006.01)
*G01N 27/30*        (2006.01)

(52) U.S. Cl.
CPC ........... *G01N 27/416* (2013.01); *G01N 27/30* (2013.01)

(58) Field of Classification Search
None
See application file for complete search history.

(56) References Cited

PUBLICATIONS

T. Yasukawa, et al., "Dual Imaging of Topography and Photosynthetic Activity of a Single Protoplast by Scanning Electrochemical Microscopy", Analytical Chemistry, 71(20): p. 4637-4641, Oct. 1999.*
C. Yang, et al., "Fabrication and Characterization of a Dual Submicrometer-Sized Electrode", Analytical Chemistry, 81(17): p. 7496-7500, Sep. 2009.*
Z. Zhu, et al. "Novel dual Pt-Pt/IrOx ultramicroelectrode for pH imaging using SECM in both potentiometric and amperometric modes", Electrochemistry Communications, 88: p. 47-51, Mar. 2018.*
Alligrant, T.M., et al., "Single Nanoparticle Collisions at Microfluidic Microband Electrodes: The Effect of Electrode Material and Mass Transfer", Langmuir, (2014), vol. 30, pp. 13462-13469.

(Continued)

*Primary Examiner* — J. Christopher Ball
(74) *Attorney, Agent, or Firm* — Purdue Research Foundation

(57)        ABSTRACT
The electrochemical sensor system includes a capillary and a conductive wire at least partially disposed within the capillary. The wire is provided as a plurality of wires, such as a pair wires. The plurality of wires is disposed substantially parallel within the capillary. The wire extends from a first terminal end of the capillary to a second terminal end of the capillary. Where the wire is provided as a plurality of wires, the capillary includes a capillary wall separating the plurality of wires. The first terminal end of the capillary includes an electrode surface where the wire is disposed therethrough and is exposed, thus forming an electrode. The exposed wire is configured to form a liquid-air interface where a droplet is disposed on the exposed wire. The wire extending from the second terminal end of the capillary is coupled to a processor configured to perform the electrochemical analysis.

13 Claims, 7 Drawing Sheets

(56) References Cited

PUBLICATIONS

Bain, R.M., et al., "Accelerated hydrazone formation in charged microdroplets", Rapid Commun. Mass Spectrom., (2016), vol. 30, pp. 1875-1878.

Girod, M., et al., "Accelerated Bimolecular Reactions in Microdroplets Studied by Desorption Electrospray Ionization Mass Spectrometry", Chem. Sci., (2011), vol. 2, pp. 501-510.

Kaufmann, P.J., et al., "Aerosol Electroanalysis by PILSNER: Particle-into-Liquid Sampling for Nanoliter Electrochemical Reactions", ACS Meas. Sci. Au, (2022), vol. 2, pp. 106-112.

Lebegue, E., et al., "Electrochemical Detection of Single Phospholipid Vesicle Collisions at a Pt Ultramicroelectrode", Langmuir, (2015), vol. 31, pp. 11734-11739.

Lee, J.K., et al., "Spontaneous Formation of Gold Nanostructures in Aqueous Microdroplets", Nat. Commun., (2018), vol. 9, 1562, 9 pages.

Lee, J.K., et al., "Micrometer-Sized Water Droplets Induce Spontaneous Reduction", J. Am. Chem. Soc., (2019), vol. 141, pp. 10585-10589.

Sameenoi, Y., et al., "Microfluidic Electrochemical Sensor for On-Line Monitoring of Aerosol Oxidative Activity", J. Am. Chem. Soc., (2012), vol. 134, pp. 10562-10568.

* cited by examiner

ELECTROCHEMICAL SENSOR SYSTEM AND METHOD

CROSS REFERENCE TO RELATED APPLICATIONS

This application claims the priority benefit of U.S. Provisional Patent application No. 63/452,465, filed Mar. 16, 2023, the contents of which is incorporated herein by reference in its entirety.

GOVERNMENT RIGHTS

This invention was made with government support under CHE 2319925 and CHE 2003587 awarded by the National Science Foundation. The government has certain rights in the invention.

FIELD

The disclosure generally relates to sensor systems and, more particularly, to portable sensor systems.

INTRODUCTION

This section provides background information related to the present disclosure which is not necessarily prior art.

Chemistry in tiny volumes (droplets) differs drastically from bulk phases. Studies have demonstrated chemical reaction acceleration in droplets generated by electrospray and nebulization. Other studies have demonstrated changes in chemistry in droplets suspended in an oil continuous phase. It has been indicated that experiments are necessary that rigorously elucidate how chemical reactions change as a function of droplet size. The most robust way to study such chemistry is on a droplet-by-droplet basis, where droplet size heterogeneity can be rigorously accounted for. Such experiments are currently difficult because measurement tools are not yet available to probe kinetics and thermodynamics in sub-femtoliter volumes at the single droplet level. These experiments represent a great challenge and opportunity for analytical chemistry.

Stochastic electrochemistry has emerged as a reliable means by which reactivity can be measured on single particles, one at a time. Ultramicroelectrodes have been used to probe the heterogeneous electrocatalysis of single atoms and nanoparticles as well as measure reactions in small droplets and vesicles. Electrochemistry's key measurement requirement is two electrodes. Stochastic electrochemical techniques have been used successfully to demonstrate enzymatic rates are accelerated in sub-femtoliter volumes, and rates scale with the inverse of droplet radius. However, to meet the two-electrode requirement, nanodroplets were suspended in oil. This is a limitation considering most observations of reaction acceleration and curious chemistry in droplets have entailed the dropletlair interface. This interface is much more realistic, as the dropletlair interface is ubiquitous in nature.

Accordingly, there is a continuing need for an electrochemical sensor system and a method that may detect single atoms and nanoparticles in aerosols. Desirably, the electrochemical sensor system may be more portable than known electrochemical sensors.

SUMMARY

In concordance with the instant disclosure, an electrochemical sensor system and method that may detect the contents of single aerosols has surprisingly been discovered. Desirably, the electrochemical sensor system may be more portable in comparison to known electrochemical sensors.

The electrochemical sensor system may include a capillary and a conductive wire at least partially disposed within the capillary. The wire may include a metal wire, such as a wire including platinum. The wire may also be provided as a plurality of wires, such as a pair of wires. The plurality of wires may be disposed substantially parallel within the capillary. In a specific embodiment, the wire may extend from a first terminal end of the capillary to a second terminal end of the capillary. Where the wire is provided as a plurality of wires, the capillary may include a capillary wall separating the plurality of wires. The first terminal end of the capillary may include an electrode surface where the wire is disposed therethrough and is exposed, thus forming an electrode. In a specific example, a plurality of wires may be exposed through the electrode surface, thus forming a plurality of electrodes. The exposed wire may be configured to form a liquid-air interface where a droplet is disposed on the exposed wire. In other words, the sensor of the first terminal end may be configured to detect an electrochemical characteristic of a droplet disposed on the exposed wire. In another specific example, the wire extending from the second terminal end of the capillary may be coupled to a processor configured to perform the electrochemical analysis. In an even more specific example, the processor may include a potentiostat.

Various ways of manufacturing the electrochemical sensor system are provided. For instance, the electrochemical sensor may be manufactured according to a first method. The first method may include a step of disposing a first wire into a first channel of a capillary. Specifically, the wire may be disposed through an electrode surface of a first terminal end of the capillary. The wire may also extend to a second terminal end of the capillary. Then, a second wire may be disposed into a second channel of the capillary. Specifically, the second wire may also be disposed through the electrode surface of the first terminal end of the capillary. The second wire may also extend to the second terminal end of the capillary. The capillary may then be heat-sealed. In certain circumstances, the capillary may be heat-sealed in a vacuum to militate against air bubbles being trapped in the capillary. The first wire and/or the second wire exposed through the electrode surface may be polished. The first wire and/or the second wire extending to the second end of the capillary may be coupled to a processor. One skilled in the art may select other suitable ways of manufacturing the electrochemical sensor system, within the scope of the present disclosure.

Various ways of using the electrochemical sensor system are provided. For instance, the electrochemical sensor may be used according to a second method. The second method may include providing the electrochemical sensor system having a capillary including at least two channels divided by a capillary wall. The capillary may have a first terminal end and a second terminal end. A first conductive wire may be disposed through a first channel extending from the second terminal end to the first terminal end. A second conductive wire may also be disposed through a second channel extending from the second terminal end to the first terminal end. The first conductive wire and/or the second conductive wire may further be disposed through an electrode surface of the first terminal end thus forming an electrode. A processor may be coupled to the wire at the second terminal end. The processor may be configured to detect the electrochemical characteristic from the droplet. Next, the droplet may be disposed on the electrode surface. The electrode on the electrode surface may be covered. Afterwards, the electrochemical characteristic of the droplet may be detected via the processor. A skilled artisan may select other suitable ways of using the electrochemical sensor system, within the scope of the present disclosure.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Figure 1A:
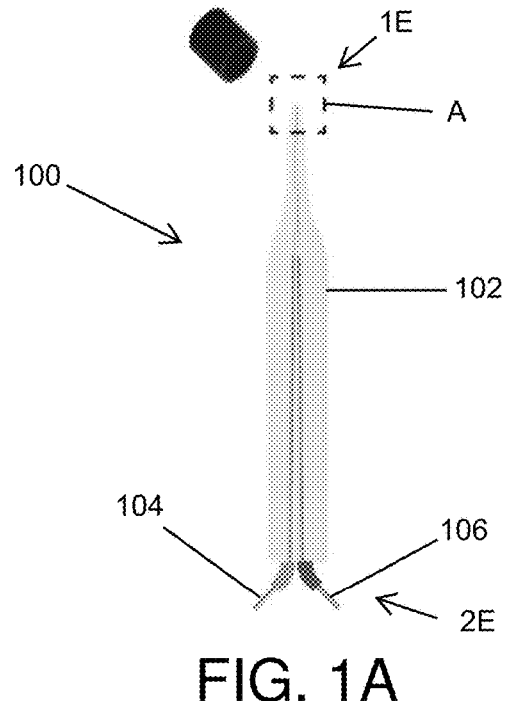
FIG. 1A is a top perspective view of a schematic diagram of an electrochemical sensor system, according to one embodiment of the present disclosure.
Figure 1B:
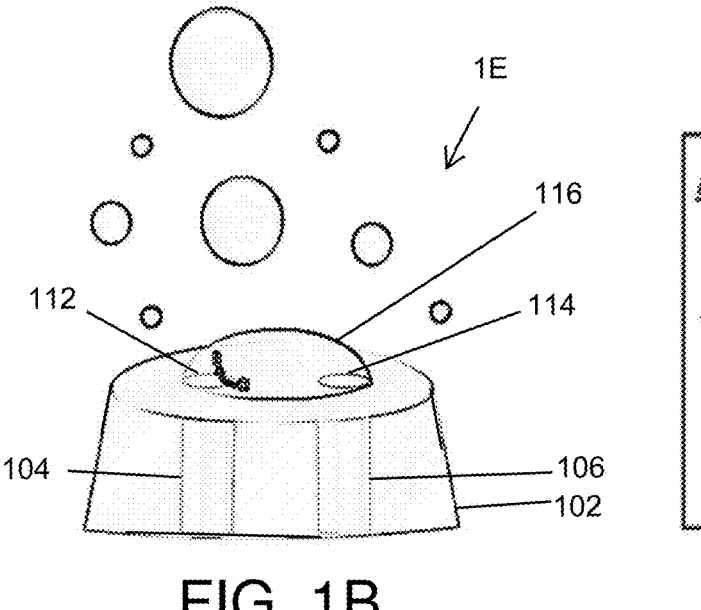
FIG. 1B is an enlarged top perspective view of A, as shown in FIG. 1A, further depicting an aerosol droplet spanning the distance between the platinum disks and/or electrodes which may produce a transient of current from an electrochemical reaction; according to one embodiment of the present disclosure.
Figure 1C:
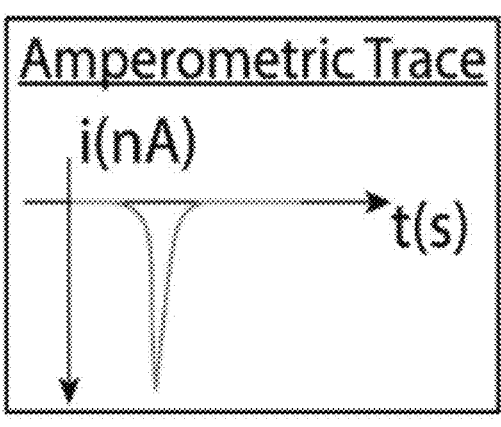
FIG. 1C is a line graph illustrating an amperometric i-t trace of the analyzed current, as represented in FIG. 1B, according to one embodiment of the present disclosure.
Figure 2A:
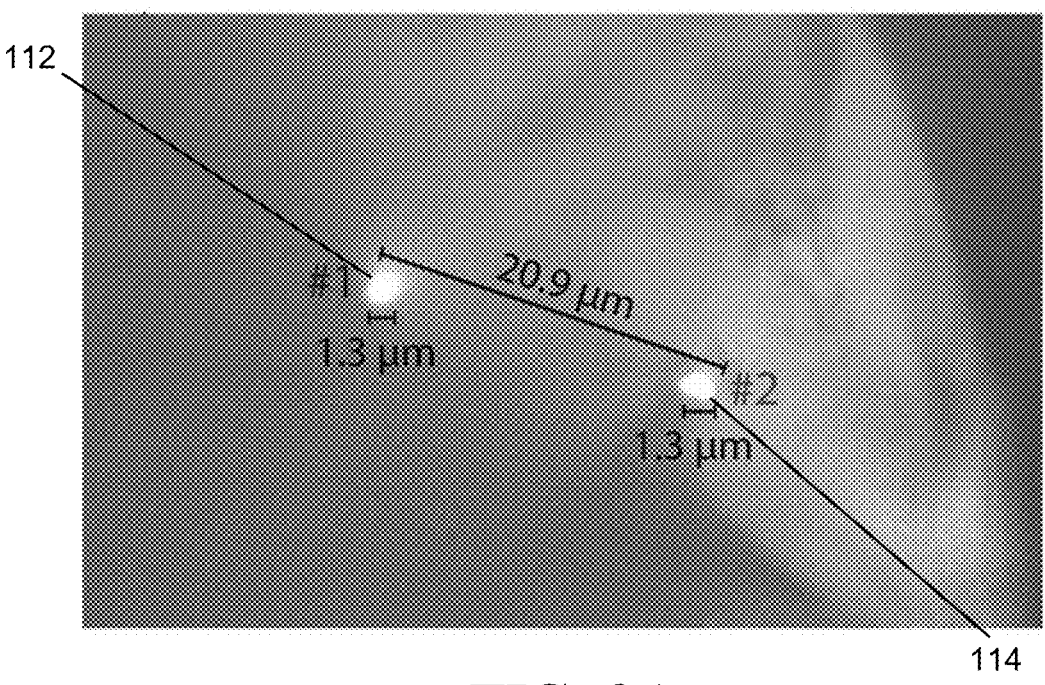
FIG. 2A is an optical microscopy image illustrating electrode dimensions and the interelectrode distance that an aerosol droplet may span to produce an amperometric response, according to one embodiment of the present disclosure.
Figure 2B:
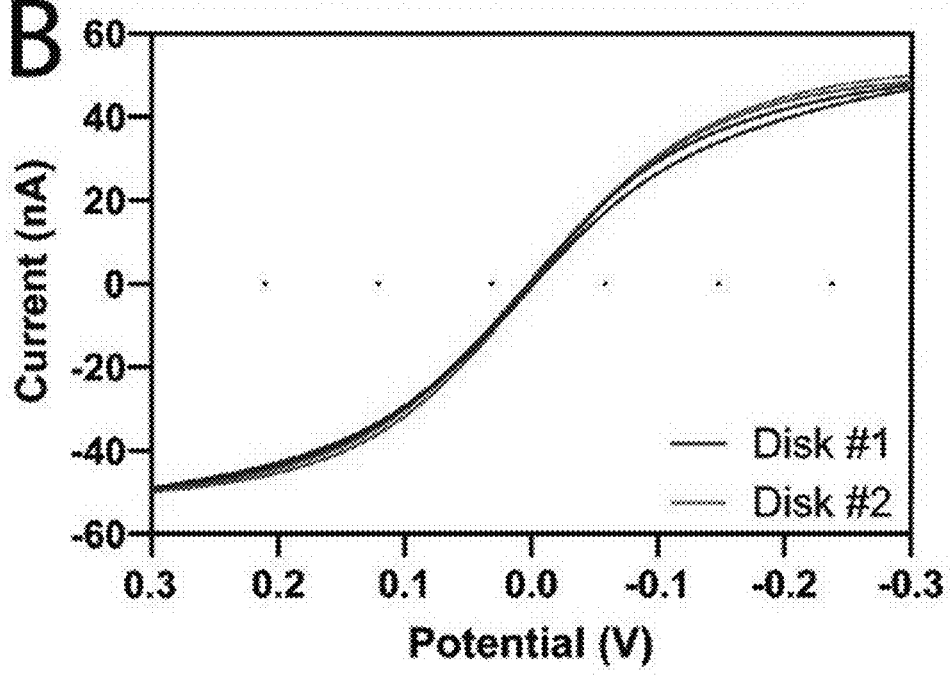
Figure 3:
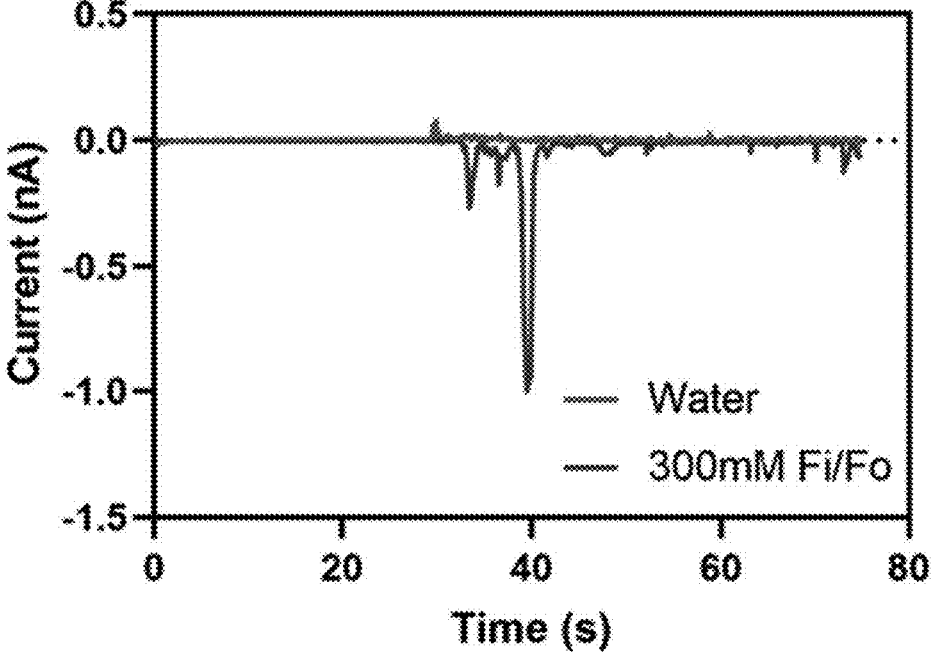
Figure 4:
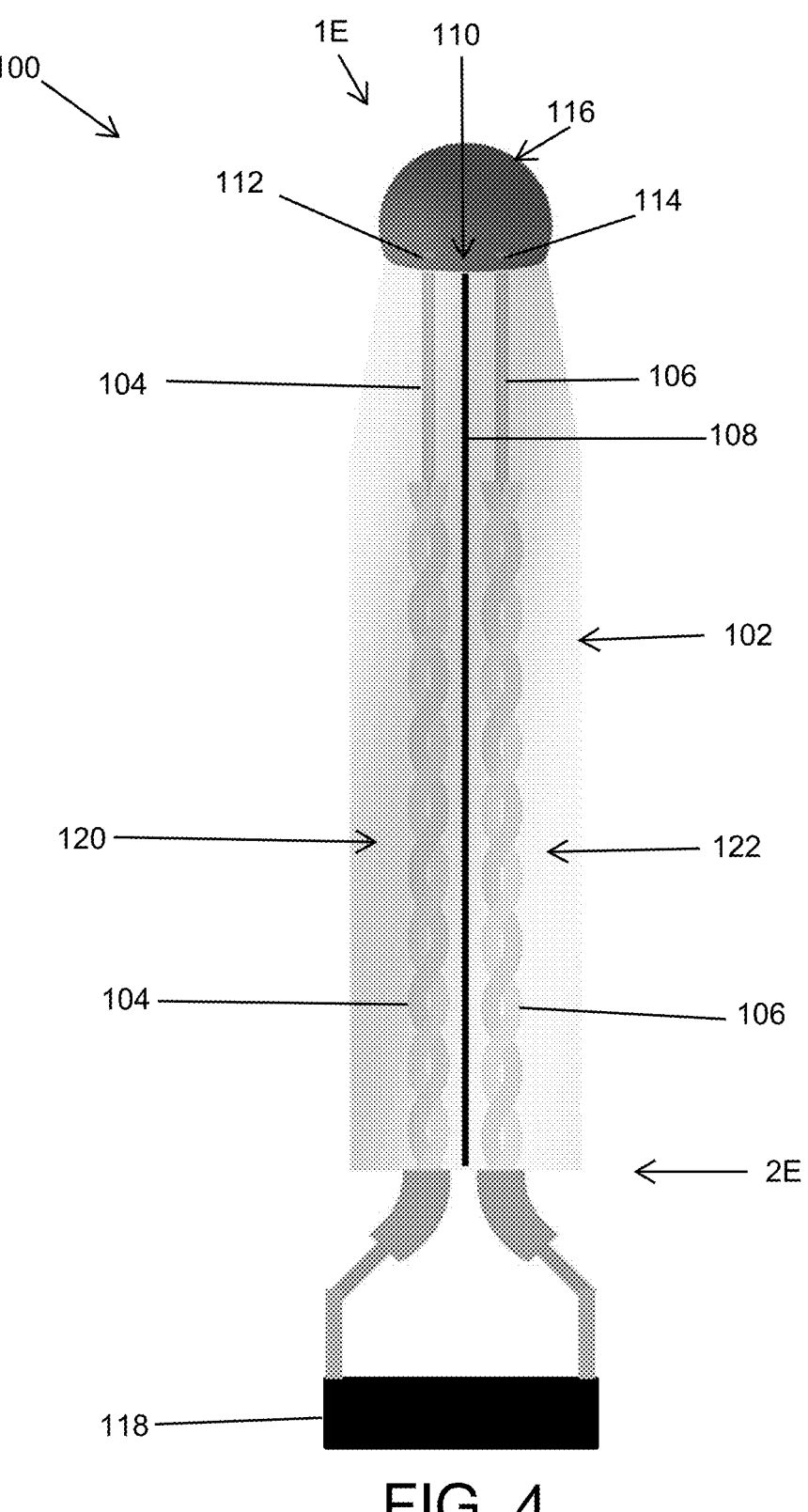
Figure 5:
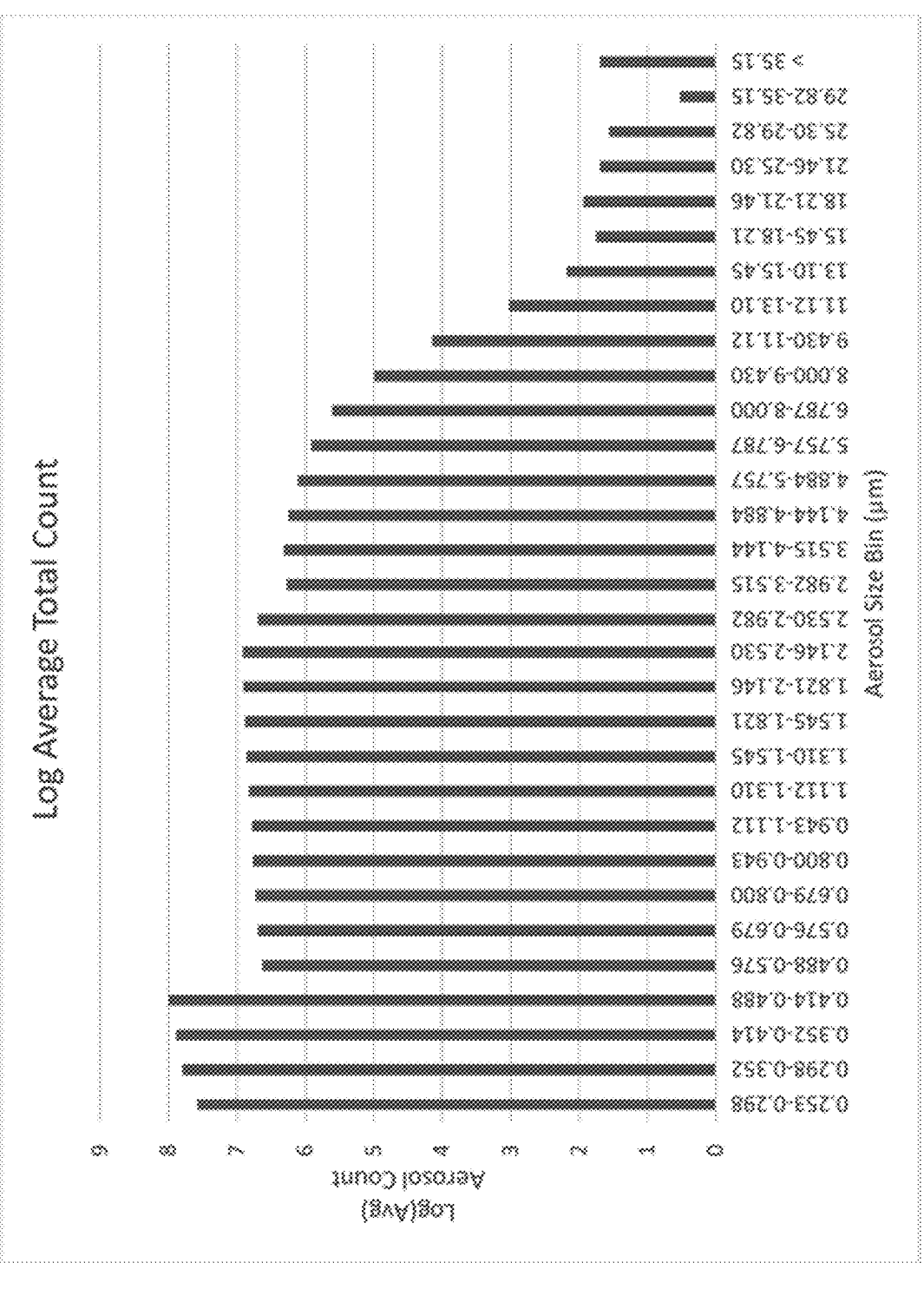
Figure 6:
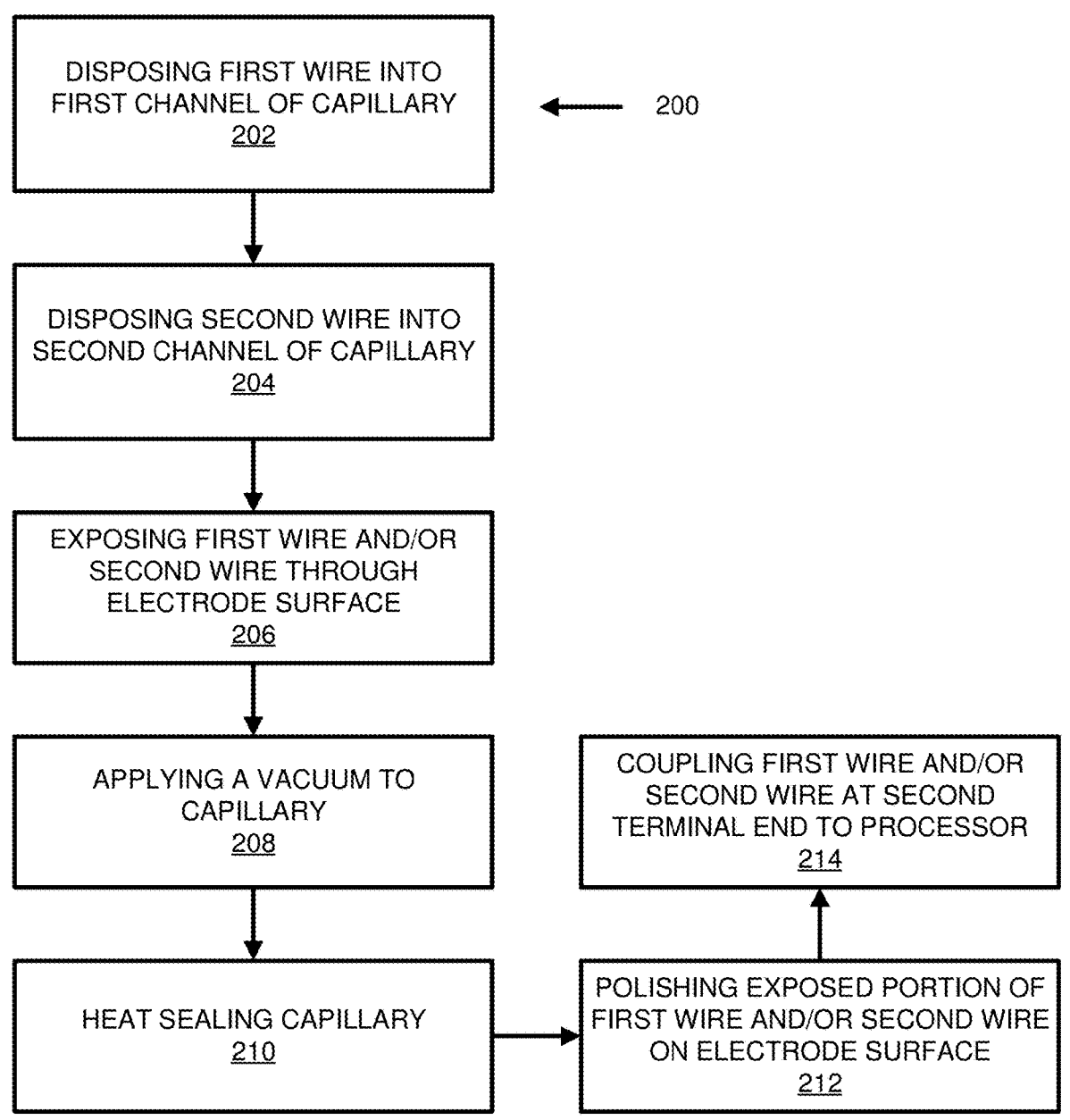
Figure 7:
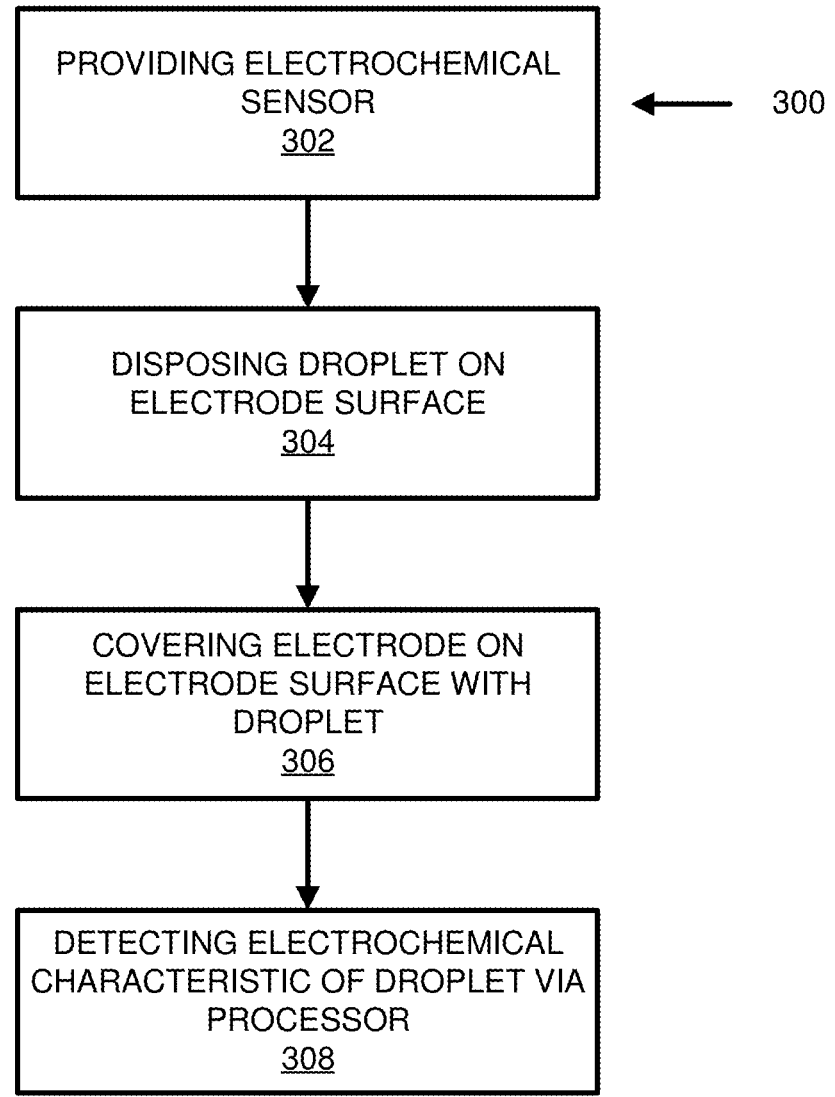

FIG. 2B is a line graph illustrating cyclic voltammograms of two electrodes, further depicting where one acts as the working electrode while the other acts as the quasi-reference/counter electrode, where the voltammograms were taken in 300 mM ferrocyanide/ferricyanide solution, and the radius obtained from limiting current of the voltammogram closely matches the radius measured under microscopy, as shown in FIG. 2A, according to one embodiment of the present disclosure;

FIG. 3 is a line graph illustrating an amperometric i-t trace showing discrete aerosol impact events, most notably at 33 and 40 seconds, where the potential is held at +0.3 V for this experiment and the solution of 300 mM hexacyanoferrate (II/III) (Fi/Fo) is nebulized (beginning at 30 s), the ferrocyanide in aerosols that impact the dual-barrel electrode may convert to ferricyanide, producing a spike in current, according to one embodiment of the present disclosure;

FIG. 4 is a front elevational schematic view of the electrochemical sensor system having a capillary, two threaded conductive wires, and a droplet of an aerosol disposed on a first terminal end of the capillary, according to one embodiment of the present disclosure;

FIG. 5 is a histogram illustrating a log of the average aerosol count per size bin across three nebulization runs (~1 minute per run), further depicting while there are a small number of aerosols in the desired size range (diameter $\geq 20$ μm), there are enough to expect stochastic collisions over an experimental time of similar duration;

FIG. 6 is a flowchart of a method for manufacturing the electrochemical sensor system, according to one embodiment of the present disclosure;

FIG. 7 is a flowchart of a method for using the electrochemical sensor system, according to one embodiment of the present disclosure.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the FIG. is turned over, elements described as "below", or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present disclosure may enable the use of stochastic electrochemistry in single aerosol events. As shown in FIGS. 1A-1C and 4, the electrochemical sensor system 100 may include a capillary 102 and a wire 104, 106 at least partially disposed within the capillary 102. The wire 104, 106 may include a conductive wire, such as a metallic wire including platinum. The wire 104, 106 may also be provided as a plurality of wires, such as a pair of wires. The plurality of wires 104, 106 may be disposed substantially parallel within the capillary 102. In a specific embodiment, the wire 104, 106 may extend from a first terminal end 1E of the capillary 102 to a second terminal end 2E of the capillary 102. Where the wire 104, 106 is provided as a plurality of wires, the capillary 102 may include a capillary wall 108 separating the plurality of wires. The first terminal end 1E of the capillary 102 may include an electrode surface 110 where the wire 104, 106 is disposed therethrough and is exposed, thus forming an electrode 112, 114. In a specific example, the plurality of wires 104, 106 may be exposed through the electrode surface 110, thus forming a plurality of electrodes 112, 114. The electrode 112, 114 may be configured to form a liquid-air interface where a droplet 116 is disposed on the electrode 112, 114. In other words, the electrode 112, 114 of the first terminal end 1E may be configured to detect an electrochemical characteristic of a droplet 116 disposed on the electrode 112, 114. In another specific example, the wire 104, 106 extending from the second terminal end 2E of the capillary 102 may be coupled to a processor 118 configured to perform the electrochemical analysis. In an even more specific example, the processor 118 may include a potentiostat.

The capillary 102 may be provided in various ways. For instance, the capillary 102 may be provided with glass and/or plastic. For instance, the wire 104, 106 may be heat scaled in glass while under vacuum to exclude air pockets from becoming trapped within the capillary 102. Advantageously, where the capillary 102 is provided with glass, the seal of the capillary 102 may be enhanced. Other methods for sealing the capillary 102 are contemplated, such as liquid sealants. A liquid sealant may include materials such as nail polish. One skilled in the art may select other suitable ways to provide the capillary 102.

The wire 104, 106 may be provided in various ways. For instance, the wire 104, 106 may be arranged in a manner to promote an electrical connection between the processor 118 and the electrodes 112, 114. Provided as a non-limiting example, as shown in FIG. 4, the wire 104, 106 may be provided as a threaded wire. In certain circumstances, the threaded wire may help ensure that there is metal-metal contact for the transfer of electrons, i.e. so that the processor 118 at the second terminal end 2E may read a signal from what is detected at the electrode 112, 114 on the first terminal end 1E. In a more specific example, the threaded wire 104, 106 may be at least partially dipped and/or coated with a liquid metal. Without being bound to any particular theory, it is believed the coating of metal on the wire 104, 106 may enhance the electrical connection between the processor 118 and the electrode 112, 114. In another non-limiting example, the wire 104, 106 may include a first threaded wire 104 and a second threaded 106 separated by a capillary wall 108. Advantageously, the sensitivity of the wire 104, 106 may be enhanced where the plurality of wires 104, 106 are separated by the capillary wall 108. In certain circumstances, the electrochemical sensor system 100 may be provided with the glass capillary 102 heat sealed around two wires 104, 106, otherwise known as a dual-barrel electrode. As a non-limiting example, each electrode 112, 114 may have around a 650 nm radius. In a specific, non-limiting example, each electrode 112, 114 may have a radius around 100 nm or less. In an even more specific example, each electrode 112, 114 may have a radius around 10 nm or less. Aerosols, which are solid or liquid particles suspended in a gas, range from 2 nanometers to over 100 μm. By targeting a nebulized solution of hexacyanoferrate(II/III) at the electrode surface 110 (FIG. 1), aerosols (~20 μm diameters) hitting the micron-sized surface of the electrode 112, 114 can be resolved as discrete, stochastic events when measuring current as a function of time. The dual-barrel electrode 100 was characterized with microscopy and cyclic voltammetry and shows amperometric evidence of single aerosol collisions. The signal is achieved when an aerosol is large enough to cover the plurality of electrodes 112, 114.

With The electrochemical sensor system 100 may be provided in various ways. For instance, the electrochemical sensor system 100 may be manufactured according to a first method 200. The first method 200 may include a step 202 of disposing a first wire 104 into a first channel 120 of a capillary 102. Specifically, the first wire 104 may be disposed through an electrode surface 110 of a first terminal end 1E of the capillary 102. The first wire 104 may also extend to a second terminal end 2E of the capillary 102. Then, in another step 204, a second wire 106 may be disposed into a second channel 122 of the capillary 102. Specifically, in a further step 206, the second wire 106 may be disposed through the electrode surface 110 of a first terminal end 1E of the capillary 102. The second wire 106 may also extend to a second terminal end 2E of the capillary 102. In an additional step 210, the capillary 102 may then be heat-sealed. In certain circumstances, in a step 208 of the method 200, the capillary 102 may be heat-sealed in a vacuum to militate against air bubbles being trapped in the capillary 102. The first wire 104 and/or the second wire 106 exposed through the electrode surface 110 may be polished in an additional step 212 of the method 200. The first wire 104 and/or the second wire 106 extending to the second terminal end 2E of the capillary 102 may be coupled to a processor 118 in another step 214 of the method 200. The present disclosure is not limited to the particular order of the provided steps. In other words, it is contemplated that the order of the provided steps in any method of the present disclosure may be rearranged. One skilled in the art may select other suitable ways of manufacturing the electrochemical sensor system 100, within the scope of the present disclosure.

In certain circumstances, the first wire 104 and the second wire 106 may include a plurality of strands that may be coupled together. For instance, the first wire 104 may include a first end portion 104A and a second end portion 104B. In a specific example, the first end portion 104A of the first wire 104 may be manufactured with a different material from the second end portion 104B of the first wire 104. The second wire 106 may also include a first end portion 106A and a second end portion 106B. In another specific example, the first end portion 106A of the second wire 106 may be manufactured with a different material from the second end portion 106B of the second wire 106. It is further contemplated that the first end portion 104A of the first wire 104 and/or the first end portion 106A of the second wire 106 may be shaped differently from the second end portion 104B of the first wire 104 and/or the second end portion 106B of the second wire 106, respectively. For instance, the first end portion 104A of the first wire 104 may be straight while the second end portion 104B of the first wire 104 may be threaded. Or the first end portion 106A of the second wire 106 may have a different diameter than the second end portion 106B of the second wire 106. When manufacturing the electrochemical sensor system 100, the first end portion 104A of the first wire 104 and the first end portion 106A of the second wire 106 may be disposed through the electrode surface 110 of the first terminal end 1E of the capillary 102. Afterwards, the capillary 102 may then be heat-sealed. As previously discussed, the capillary 102 may be heat-sealed under a vacuum. Then, the exposed portion of the first wire 104 and the second wire 106 on the first terminal end 1E of the capillary may be polished. Next, the ends of the second end portion 104B of the first wire 104 and the second end portion 106B of the second wire 106 may be disposed through the second terminal end 2E of the capillary 102. The second end portion 104B of the first wire 104 and the second end portion 106B of the second wire 106 may then be coupled to the first end portion 104A of the first wire 104 and the first end portion 106A of the second wire 106, respectively. The particular order of the steps in this method may be rearranged. One skilled in the art may manufacture the electrochemical sensor system 100 with other configurations, within the scope of the present disclosure.

The electrochemical sensor system 100 may be used in various ways. For instance, the electrochemical sensor system 100 may be used according to a second method 300. The second method 300 may include a step 302 of providing the electrochemical sensor system 100 having a capillary 102 including at least two channels 120, 122 divided by a capillary wall 108. The capillary 102 may have a first terminal end 1E and a second terminal end 2E. A conductive wire 104, 106 may be disposed through at least one of the channels 120,122 extending from the second terminal end 2E to the first terminal end 1E. The conductive wire 104, 106 may be provided as a first conductive wire 104 and a second conductive wire 106 disposed in the capillary 102 and separated by a capillary wall 108. For instance, the first conductive wire 104 may be disposed through a first channel 120 of the capillary 102 extending from the second terminal end 2E to the first terminal end 1E. The second conductive wire 106 may be disposed in a second channel 122 of the capillary 102 extending from the first terminal end 1E to the second terminal end 2E. The first conductive wire 104 and/or the second conductive wire 106 may further be disposed through an electrode surface 110 of the first terminal end 1E thus forming an electrode 112, 114. A processor 118 may be coupled to the first conductive wire 104 and/or the second conductive wire 106 at the second terminal end 2E. The processor 118 may be configured to detect the electrochemical characteristic from the droplet 116. Next, in another step 304 of the method 300, the droplet 116 may be disposed on the electrode surface 110. The electrode 112, 114 on the electrode surface 110 may be covered with the droplet 116 in the next step 306 of the method 300. Afterwards, in another step 308 of the method 300, the electrochemical characteristic of the droplet 116 may be detected via the processor 118. A skilled artisan may select other suitable ways of using the electrochemical sensor system 100, within the scope of the present disclosure.

In a more specific, non-limiting example, where the electrochemical sensor system 100 is provided as a dual-barrel electrode 112, 114 configuration. In a specific example, the capillary 102 may be a quartz theta capillary. Advantageously, quartz may melt at a similar temperature to platinum, which may allow for a tip of the electrode 112, 114 to may manufactured very small compared to known electrodes. The smaller tip of the electrode 112, 114 may desirably allow for the detection of smaller aerosols. Provided as a non-limiting example, a Sutter P-2000 laser-puller, which may heat the glass of the capillary 102 and the metal of the wire 104, 106 simultaneously, may be used to manufacture the electrochemical sensor system 100. More particularly, the laser-puller may allow the electrode surface 110 of the first terminal end 1E and the metal electrodes 112, 114 to be pulled to very small sizes, thus creating a very small electrode tip which may allow for the detection of smaller aerosols. The channels 120, 122 of the quartz theta capillary 102 may be threaded with around a 25 micrometer, platinum wire 104, 106. The platinum wire 104, 106 may be pushed into the middle of the capillary 102. The capillary 102 may then be inserted into a Sutter P-2000 laser puller. Around four cycles (30 s ON/30 s OFF) of the following heat-scaling program may be run: Heat=765; Filament=5;

Velocity=100; Delay=200; Pull=1. Once the capillary 102 appears sealed under microscope, a pull program may be initiated: Heat=715; Filament=3; Velocity=120; Delay=128; Pull=250. At least one of the dual-barrel electrodes 112, 114 that was formed may then be polished with the micropipette beveler, forming a platinum disk as a polished electrode 112, 114. Where the first wire 104 and the second wire 106 include a plurality of strands, as described above, the second end portion 104B of the first wire 104 and the second end portion 106B of the second wire 106 may be inserted into the second terminal end 2E of the capillary 102 and coupled to the first end portion 104B of the first wire 104 and the first end portion 106B of the second wire 106, respectively. Then the first wire 104 and the second wire 106 may be characterized with voltammetry and microscopy. For instance, the dual-barrel electrodes 112, 114 may then be characterized with a Hamamatsu Digital Camera C13440 Orca-Flash using Leica Software, as shown in FIG. 2A. The electrodes 112, 114 were also characterized via cyclic voltammetry in 300 mM hexacyanoferrate (II/III), as shown in FIG. 2B.

In certain circumstance, the detection of discrete aerosol events may be enhanced with the electrochemical sensor system 100 provided as the dual-barrel electrode 112, 114. Typically, aerosols are detected using a liquid collector volume to capture the aerosols and provide a cell for electrochemical measurements, such as in microfluidic devices or Particle-Into-Liquid Sampling for Nanoliter Electrochemical Reactions. While this is necessary to maintain electrical connection for measurements, this requirement could be circumvented if the platinum disks/exposed wire 104, 106 and interelectrode distance was small enough, and/or the aerosol landing on the electrode face 112, 114 was large enough to span both and/or all electrodes 112, 114 and the interelectrode distance. For this observation, the dual-barrel electrode of the present disclosure was characterized with microscopy and cyclic voltammetry, and the particle distribution of the hexacyanoferrate (II/III) aerosol particles were measured.

Cyclic voltammetry with the dual-barrel electrode in 300 mM hexacyanoferrate (II/III) shows the expected sigmoidal shape, as shown in FIG. 2B, regardless of which barrel is the working electrode and which is the quasi-reference/counter electrode. The radius of the electrode 112, 114 may be determined by using the analytical solution:

$$i_{ss} = 4nFDCr \qquad \text{Equation 1}$$

where $i_{ss}$ is the steady state current, n is the number of electrons involved in the reaction (usually 1 electron), F is Faraday's constant (96485 C/mol), D is the diffusion coefficient (approximately $6.7 \times 10^{-10}$ m$^2$/s), C is the concentration of the redox species (300 mM), and r is the radius of the working electrode. The steady state current of the voltammograms were 49.0 nA for disk #1 and 49.9 nA for disk #2. Equation 1 indicates the radii are 0.63 µm for disk #1 and 0.64 µm for disk #2. Optical microscopy measurements agree well with the voltammetry, showing two platinum disks with diameters of 1.3 µm each, as shown in FIG. 2A. The opposite edges of these disks may be separated by around 20.9 µm, indicating that an aerosol of sufficient size may impact and cover this distance to report an electrochemical signal. To see if the nebulized solution produced large enough aerosols, aerosols were sampled with the Durag D-11 spectrometer. FIG. 5 shows a size distribution of hexacyanoferrate(II/III) aerosols, where a portion of particles have diameters of around 20 µm or greater. In addition, the aqueous droplets are likely to spread out across the hydrophilic surface of the glass upon impaction, suggesting that even aerosols with smaller diameters could bridge the distance between electrodes 112, 114 and produce a response.

Thus, the conducted particle sampling and electrode characterization indicate that there are large enough aerosol particles to show stochastic collisions on the electrochemical sensor system 100, such as the dual-barrel electrode. Although very large aerosols are difficult to discern from several small aerosols between the electrodes 112, 114 that quickly coalesce to yield an electrochemical signal, this was ruled out because very small droplets would evaporate most quickly, suggesting any transients observed are from single, micrometer-sized droplets. This was investigated by nebulizing a 300 mM, 1:1 solution of redox species, hexacyanoferrate (II/III) and recording the response with an amperometric i-t trace (FIG. 3) at +0.3 V vs. the hexacyanoferrate (II/III) couple (this couple will poise the second electrode upon impact).

The trace shows discrete events of stochastic aerosol collisions across the time scale of the experiment once nebulization begins at 30 s, as shown in FIG. 3. These collisions can be seen most notably at 33 and 40 seconds. One might suggest that these peaks are due to mechanical disturbance of droplets impacting the electrode disks. However, when compared to the control trace of nebulized ultrapure water, there are no anodic peaks like there are when 300 mM hexacyanoferrate (II/III) is nebulized. Thus, the peaks in FIG. 3 seem to indicate the oxidation of ferrocyanide at the electrode surface 110. In addition, because aerosols contain each form of the redox couple, cathodic events can also be probed. By holding the potential sufficiently negative to reduce hexacyanoferrate(III) (−0.3V), the stochastic collisions can be seen as discrete events when ferricyanide is converted to ferrocyanide within an aerosol. Thus, the current response is dictated by whether species are being oxidized or reduced, depending on the potential that is being applied.

While many stochastic events in known systems result in a peak that decays to a new steady state level, these aerosol collisions of the present disclosure always return to the original steady state current. The amperometric transients observed suggest that redox molecules in the droplet are rapidly consumed or are only momentarily in contact with the electrode surface 110. The small quantity of redox molecule present in an aerosol would not produce a steady state current for long. In some cases, an aerosol may survive long enough (i.e., not evaporate) to produce a brief steady state current before vanishing, like the event at 48 seconds. However, most stochastic events do not reach a new steady state, likely due to evaporation and the constant spray of aqueous particles across the surface of the electrode 112, 114. Another important note on these transients is that they are not always equal in magnitude. We suggest that heterogeneity in transient size not only depends on the evaporation but the geometry of the droplet on the dual barrel electrochemical sensor system 100. The contact angle of aqueous droplets on quartz may be less than 90 degrees. Thus, the closer the aerosol droplet boundary is to the working electrode, the more diffusion of redox species to the electrode will be hindered. This will in turn hinder the steady-state current response. COMSOL Multiphysics simulations of an identical environment show that as the droplet boundary approaches the working electrode, the current response diminishes. The diffusion layer reaches the droplet boundary, consuming all the species at the boundary such that diffusion is limited to the other directions. With the diffusion of the redox species hindered, the current response is diminished.

Many observations have supported the idea that the dropletlair interface is highly important in driving chemistry that does not occur in the bulk phase. Advantageously, the electrochemical sensor system 100 of the present disclosure enables one to probe chemical reactions at the single droplet level. As a measurement tool to study kinetics, electrochemistry can probe rates that span over 12 orders of magnitude. The present disclosure also desirably provides a stochastic electrochemical method to single aerosol droplets. The present disclosure uniquely includes dual-barrel electrodes, where nanoelectrodes or microelectrodes 112, 114 are separated by only several micrometers. When an aerosol that is large enough to traverse both electrodes irreversibly adsorb, the electrochemistry of the single adsorbed droplet can be probed. These transient events are dependent on the redox species present, and on whether the potential is anodic or cathodic. The magnitude of these events is also affected by the geometry and location of the aerosol impact on the electrode 112, 114. The presented measurements represent a significant advance in measurement science and open the door to probe the dropletlair interface on a droplet-by-droplet basis.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions, and methods can be made within the scope of the present technology, with substantially similar results.

What is claimed is:

1. An electrochemical sensor system configured to detect an electrochemical characteristic from a droplet, the system comprising:

a capillary having at least two channels divided by a capillary wall, the capillary having a first terminal end and a second terminal end, and wherein the capillary is manufactured from a plastic material;

a conductive wire disposed through at the least two channels extending from the second terminal end to the first terminal end, the wire further disposed through an electrode surface of the first terminal end thus forming an electrode; and a processor coupled to the wire at the second terminal end, the processor configured to detect the electrochemical characteristic from the droplet.

2. The electrochemical sensor system of claim 1, wherein the conductive wire includes a plurality of conductive wires disposed substantially parallel to each other separated by the capillary wall, thus providing a plurality of electrodes.

3. The electrochemical sensor system of claim 1, wherein the conductive wire includes a platinum material.

4. The electrochemical sensor system of claim 1, wherein the processor includes a potentiostat.

5. The electrochemical sensor system of claim 1, wherein the conductive wire is provided as a threaded wire.

6. The electrochemical sensor system of claim 1, wherein the electrode has cross-sectional radius less than six hundred fifty nanometers.

7. The electrochemical sensor system of claim 6, wherein the electrode has cross-sectional radius less than one hundred nanometers.

8. The electrochemical sensor system of claim 7, wherein the electrode has cross-sectional radius less than ten nanometers.

9. The electrochemical sensor system of claim 2, wherein the plurality of electrodes includes at least one working electrode and at least one quasi- reference/counter electrode.

10. A method of manufacturing an electrochemical sensor system, the method comprising the steps of:

disposing a first wire in a first channel of a capillary;

disposing a second wire in a second channel of the capillary;

exposing at least one of the first wire and the second wire through an electrode surface on a first terminal end of the capillary;

sealing the electrode surface with a liquid sealant;

polishing at least one of the first wire and the second wire exposed through the electrode surface; and coupling at least one of the first wire and the second wire at a second terminal end of the capillary to a processor.

11. The method of claim 10, further comprising a step of heat sealing the capillary around the wire after the step of exposing at least one of the first wire and the second wire through the electrode surface.

12. The method of claim 11, further comprising a step of applying a vacuum to the capillary before the step of heat sealing the capillary.

13. An electrochemical sensor system configured to detect an electrochemical characteristic from a droplet, the system comprising:

a capillary having at least two channels divided by a capillary wall, the capillary having a first terminal end and a second terminal end;

a conductive wire disposed through at the least two channels extending from the second terminal end to the first terminal end, the wire further disposed through an electrode surface of the first terminal end thus forming an electrode; and a processor coupled to the wire at the second terminal end, the processor configured to detect the electrochemical characteristic from the droplet wherein the conductive wire includes a plurality of conductive wires disposed substantially parallel to each other separated by the capillary wall, thus providing a plurality of electrodes, and wherein the plurality of electrodes includes at least one working electrode and at least one quasi-reference/counter electrode.

* * * * *